United States Patent [15] 3,691,475
Mouri et al. [45] Sept. 12, 1972

[54] VOLTAGE CONTROLLED OSCILLATOR

[72] Inventors: Katsuo Mouri, Yokohama; Gentaro Miyazaki, Fujisawa; Hiroaki Nabeyama, Yokohama, all of Japan

[73] Assignee: Hitachi, Ltd., Tokyo, Japan

[22] Filed: June 21, 1971

[21] Appl. No.: 154,841

[30] Foreign Application Priority Data

July 24, 1970 Japan...............45/54404
July 24, 1970 Japan...............45/54406

[52] U.S. Cl..................331/8, 178/69.5 CB, 331/20, 331/34, 331/116 R, 331/135, 331/177 R

[51] Int. Cl..........H03b 3/04, H03b 5/36, H04n 9/46

[58] Field of Search..331/20, 34, 116 R, 135, 177 R, 331/8, 108 B; 178/5.4 HE, 5.4 CK, 69.5 CB, 5.4 SY

[56] References Cited

UNITED STATES PATENTS 3,183,455 5/1965 Swain................331/177 V X
3,592,960 7/1971 Cushing et al. ..........331/20 X
3,639,859 2/1972 Zwlisen.................331/135 X

*Primary Examiner*—Roy Lake
*Assistant Examiner*—Siegfried H. Grimm

[57] ABSTRACT

An oscillation circuit loop includes two phase shifters for advancing and delaying the phase of an input signal respectively, an adder for obtaining the vector sum of the output signals of these two phase shifters, and feedback means for the positive feedback of the output signal of the adder to an oscillation amplifier through a tank circuit. An external control voltage is applied to the adder so as to continuously vary the relative magnitude of the two signals added to each other by the adder. With an oscillator having such a construction, the degree of phase shift by the phase shifters and the value of Q of the tank circuit can be freely selected, and as a result, any desired sensitivity and phase control range can be freely obtained.

9 Claims, 12 Drawing Figures

INVENTORS
KATSUO MOURI, GENTARO MIYAZAKI
and HIROAKI NABEYAMA
BY Craig, Antonelli & Hill
ATTORNEYS INVENTORS
KATSUO MOURI, GENTARO MIYAZAKI and
HIROAKI NABEYAMA
BY Craig, Antonelli & Hill
ATTORNEYS INVENTORS
KATSUO MOURI, GENTARO MIYAZAKI and
HIROAKI NABEYAMA
BY Craig, Antonelli & Hill
ATTORNEYS

INVENTORS

KATSUO MOURI, GENTARO MIYAZAKI and

HIROAKI NABEYAMA

BY Craig, Antonelli & Hill

ATTORNEYS

VOLTAGE CONTROLLED OSCILLATOR

BACKGROUND OF THE INVENTION

1. Field of the Invention

This invention relates to voltage controlled oscillators and more particularly to a voltage controlled oscillator which can be easily integrated to serve as an oscillator of the automatic phase control system having a satisfactory control characteristic and is most suitable for use in an integrated color synchronizing circuit.

2. Description of the Prior Art

The colpitts oscillator, which is one of known voltage controlled oscillators, employs a variable capacitor diode as one of capacitors determining the oscillation frequency. A control voltage is applied to this variable capacitor diode for controlling the oscillation frequency of the oscillator.

A variable reactance element such as a variable capacitor diode employed in such an oscillator is defective in that the variation in the reactance relative to the control voltage is small and the reactance varies non-linearly relative to a variation in the control voltage. The variable reactance element is further defective in its large temperature dependence. Thus, the oscillator employing such variable reactance element is defective in that its sensitivity is low, its frequency control characteristic is non-linear and temperature compensation is required.

In an attempt to overcome the above defects, a voltage controlled oscillator which does employ such a variable reactance element has been proposed. For example, a paper entitled "An IC Approach to the Subcarrier Regeneration Problem," IEEE Transactions on Broadcast and Television Receivers, Vol. BTR–15, No. 2, pp. 224–227, 1969 discloses a color synchronizing circuit employing such a voltage controlled oscillator. However, the oscillator employed in this circuit is defective in that it has a narrow frequency control range and the maximum variable range in terms of phase is only 45°. The oscillator is further defective in that it has an unbalanced control range due to the fact that the variable range is from −18.5° to +26.5°. Furthermore, the color synchronizing circuit employing this oscillator is difficult to integrate due to a large number of external components and terminals, and thus any improvements in the production yield rate and the rate of integration of parts (the ratio of parts that can be integrated to those that cannot be integrated) cannot be expected.

SUMMARY OF THE INVENTION

It is a primary object of the present invention to provide a voltage controlled oscillator which is free from all the defects above described and is most suitable for integration. That is, the present invention contemplates the provision of a voltage controlled oscillator whose frequency control sensitivity is 10 to 100 times as high as that of conventional oscillators employing a variable capacitor diode and which has a greatly extended and well balanced phase control range and, exhibits a control characteristic of good linearity.

Another object of the present invention is to provide an integrated color synchronizing circuit which has a substantially doubled and yet well balanced phase control range and is provided with a reduced number of terminal pins and external components compared with conventional circuits of this kind.

The present invention which attains the above and other objects provides a voltage controlled oscillator comprising an oscillation amplifier, two phase shifters, an adder and a tank circuit. One of the two phase shifters advances the phase by $\theta_1$, while the other delays the phase by $\theta_2$. An output signal $\dot{a}$ of the oscillation amplifier is applied to these two phase shifters to obtain a signal $\dot{b}$ whose phase is advanced by $\theta_1$ and a signal $\dot{c}$ whose phase is delayed by $\theta_2$. These two signals $\dot{b}$ and $\dot{c}$ are applied to the adder to produce a signal $\dot{d}$ which is the sum of the signals $\dot{b}$ and $c$. This signal $\dot{d}$ is positively fed back to the oscillation amplifier through the tank circuit. In this manner, an oscillator can be obtained which oscillates at the natural frequency of the tank circuit.

For the purpose of phase control, a control voltage is applied to the adder to suitably vary the magnitude of the signals $\dot{b}$ and $\dot{c}$ to be added to each other by the adder so that the phase of the composite signal $\dot{d}$ can be controlled within the range of from $\theta_1$ to $-\theta_2$. When the signal $\dot{d}$ shifted in phase in this manner is positively fed back to the amplifier through the tank circuit, the oscillator oscillates at a frequency and phase corresponding to the phase of the signal $\dot{d}$ due to the phase characteristic of the tank circuit. Therefore, the frequency can be freely controlled by varying the control voltage applied to the adder. The controllable frequency range or phase control range can be freely determined as desired by suitably selecting various factors including the degree of phase shift by the phase shifters and the frequency or phase characteristics of the tank circuit, or in other words, Q of the tank circuit. Further, a voltage controlled oscillator having a completely balanced control range can be obtained when the phase shifters are arranged so that the absolute values of the phase-lead $\theta_1$ and phase-lag-$\theta_2$ are equal to each other.

BRIEF DESCRIPTION ON THE DRAWINGS

FIG. 1 is a block diagram illustrating the basic principle of a voltage controlled oscillator according to the present invention.

FIGS. 2*a* and 2*b* are vector diagrams showing the vectors of signals appearing in the oscillator shown in FIG. 1.

Figure 6:
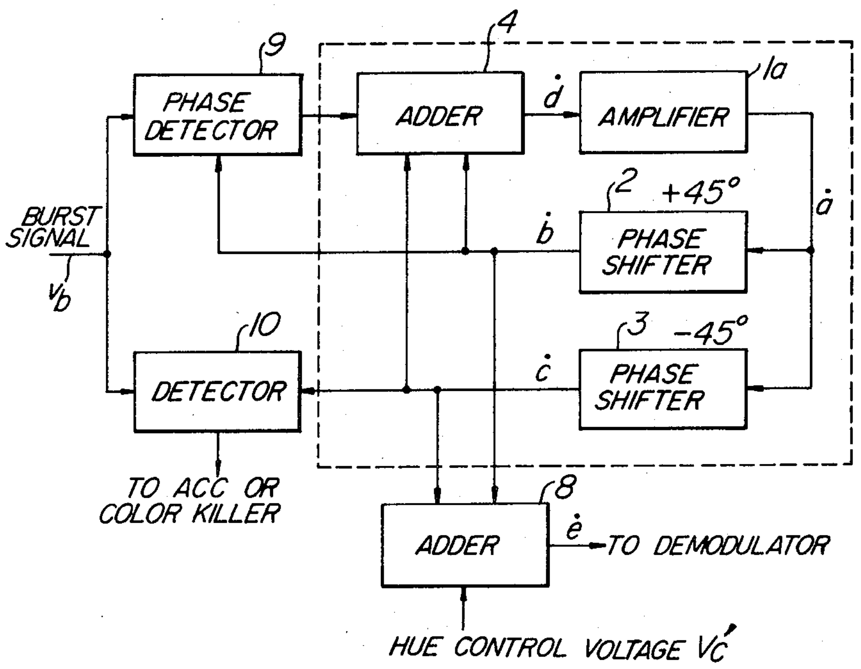
FIG. 6 is a block diagram of a further embodiment of the present invention showing an application to a color synchronizing circuit.
Figure 7A:
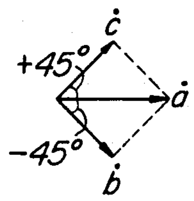
Figure 7B:
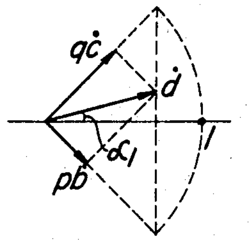
Figure 7C:
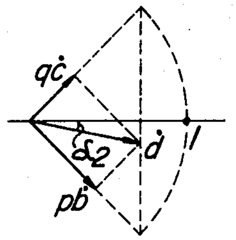

FIGS. 7*a*, 7*b* and 7*c* are vector diagrams showing the vectors of signals appearing at various parts in the block diagram shown in FIG. 6.

Figure 8:
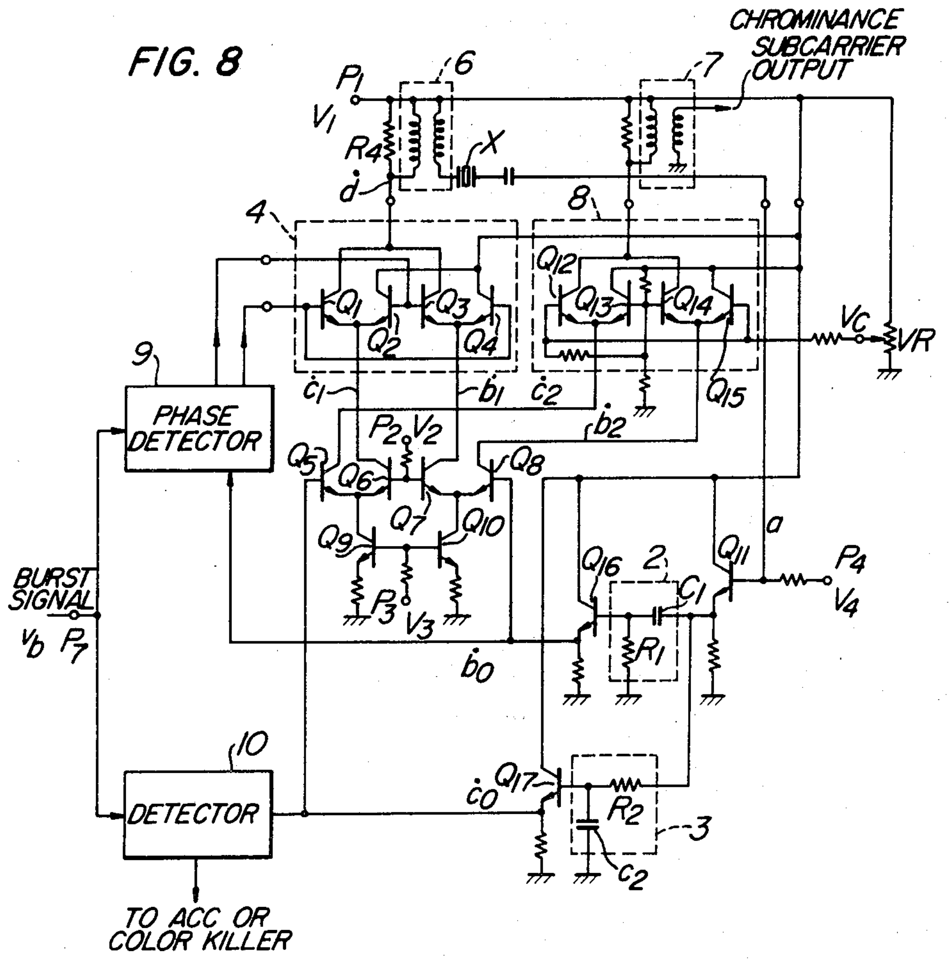

FIG. 8 is a circuit diagram showing a practical structure of the block diagram shown in FIG. 6.

Figure 9:
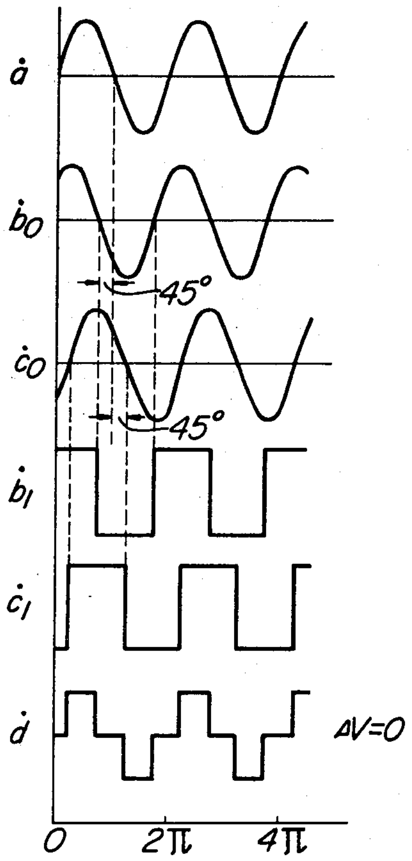

FIG. 9 shows signal waveforms appearing at various parts of the circuit shown in FIG. 8.

DESCRIPTION OF THE PREFERRED EMBODIMENTS

Figure 1:
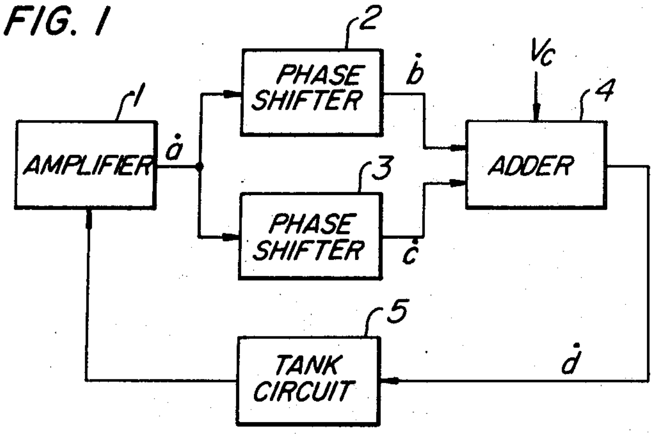
Figure 2A:
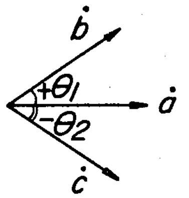
Figure 2B:
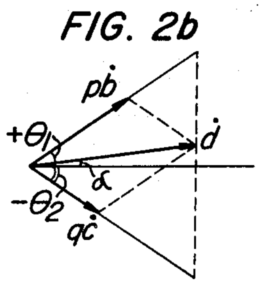

Referring to FIG. 1, an amplifier 1 delivers an output signal $\dot{a}$ which is passed through two phase shifters 2 and 3 so that a signal $\dot{b}$ which is advanced by $\theta_1$ in the phase and a signal $\dot{c}$ which is delayed by $\theta_2$ in the phase are produced by these phase shifters 2 and 3 respectively. These two signals $\dot{b}$ and $\dot{c}$ are applied to an adder 4 which produces a composite signal $\dot{d}$ which represents the vector sum of the input signals $\dot{b}$ and $\dot{c}$. The signal $\dot{d}$ is positively fed back to the amplifier 1 through a tank circuit 5 so that the oscillator oscillates at the natural frequency of the tank circuit 5. The vectors of the signals $\dot{a}$, $\dot{b}$, $\dot{c}$ and $\dot{d}$ have a relation as shown in FIGS. 2*a* and 2*b*. The signal $\dot{d}$ is given by the following equation:

$$\dot{d}=p\dot{b}+q\dot{c} \qquad (1)$$

where $p$ and $q$ are variable coefficients having the following relation:

$$p+q=1 \text{ (constant)} \qquad (2)$$

The phase of the signal $\dot{d}$ can be controlled by applying a control voltage Vc to the adder 4 thereby varying the relative magnitude of $p$ and $q$.

When this signal $\dot{d}$ is positively fed back to the amplifier 1 through the tank circuit 5, the oscillator oscillates at a frequency and phase corresponding to the phase difference between the signals $\dot{d}$ to $\dot{a}$ due to the phase characteristic of the tank circuit 5. This oscillator is a voltage controlled oscillator since the phase of the signal $\dot{d}$ is controlled by the control voltage Vc applied to the adder 4 as above described. An automatic frequency controlled or automatic phase controlled oscillator can be obtained when the oscillation output signal of the oscillator is compared with a suitable reference signal and the error voltage therebetween is used as the control voltage.

It is apparent from FIG. 2*a* that the variable range of the phase of the signal $\dot{d}$ is $(\theta_1 + \theta_2)$. Therefore, a voltage controlled oscillator having a very high control sensitivity can be obtained by suitably selecting the quality factor or Q of the tank circuit 5. It is apparent further that the phase shifters 2 and 3 can be easily obtained by using an inductor, capacitor and resistor.

Figure 3:
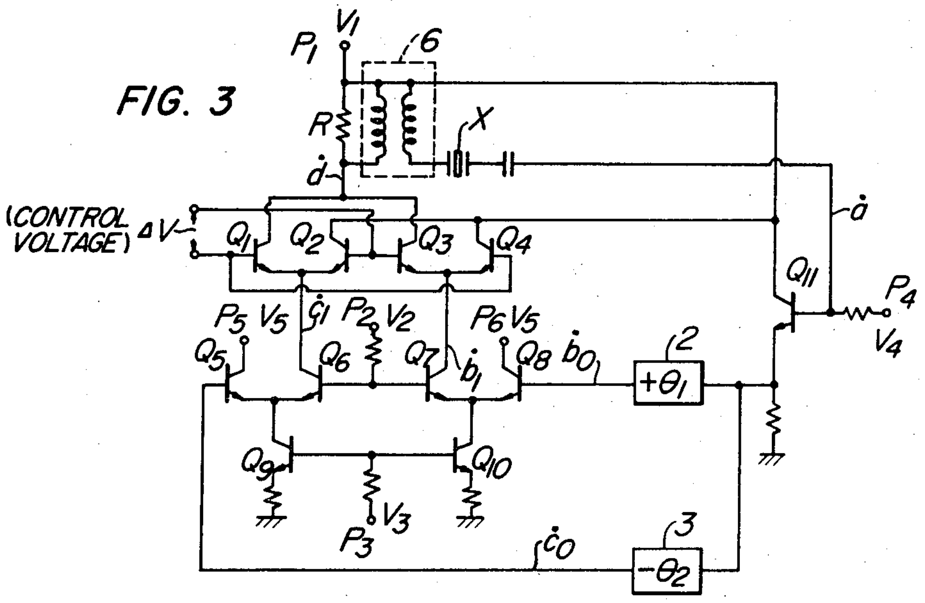
FIG. 3 is a circuit diagram showing the structure of an embodiment of the present invention.

An embodiment of the voltage controlled oscillator according to the present invention will be described with reference to FIGS. 3 and 4 in which like reference numerals are used to denote like parts appearing in FIG. 1. Referring to FIG. 3, a differential amplifier pair composed of transistors $Q_1$, $Q_2$, $Q_3$ and $Q_4$ acts as an adder 4. Another differential amplifier pair composed of transistors $Q_5$, $Q_6$, $Q_7$ and $Q_8$ is provided so that each differential amplifier amplifies a sinusoidal waveform input signal up to a saturation level to obtain a rectangular waveform output signal. A suitable bias voltage V5 is applied to a terminal $P_5$ connected to the collector of transistor $Q_5$ and to a terminal $P_6$ connected to the collector of transistor $Q_8$. Further, a pair of transistors $Q_9$ and $Q_{10}$ are provided to obtain a constant current. An emitter follower transistor $Q_{11}$ acts as an oscillation amplifier 1. A phase shifter 2 acts to advance the phase by $\theta_1$, while a phase shifter 3 acts to delay the phase by $\theta_2$. A harmonic stop filter 6 suppresses harmonics, and a tank circuit includes a crystal X. A power supply voltage V1 is applied to a terminal $P_1$, and suitable bias voltages $V_2$, $V_3$ and $V_4$ are applied to respective terminals $P_2$, $P_3$ and $P_4$.

In operation, an output signal $\dot{a}$ of the crystal X is derived from the emitter of emitter follower transistor $Q_{11}$ and is passed through the phase shifters 2 and 3 to appear as a signal $\dot{b}_o$ shifted in the phase by $+\theta_1$ and a signal $\dot{c}_o$ shifted in the phase by $-\theta_2$ respectively. The differential amplifier pair composed of the transistors $Q_5$ to $Q_8$ amplifies these signals $\dot{b}_o$ and $\dot{c}_o$ up to a saturation level to convert them into rectangular waveform signals $\dot{b}_1$ and $\dot{c}_1$ respectively. The rectangular waveform outputs $\dot{b}_1$ and $\dot{c}_1$ from the differential amplifier pair are applied to the emitters of transistors $Q_1$ to $Q_4$ constituting the adder 4. The signal $\dot{b}_1$ is distributed to the transistors $Q_3$ and $Q_4$, while the signal $\dot{c}_1$ is distributed to the transistors $Q_1$ and $Q_2$ so that a portion of the signal $\dot{b}_1$ and a portion of the signal $\dot{c}_1$ appear at the collectors of transistors $Q_1$ and $Q_3$ to be added to each other. The phase of the composite signal $\dot{d}$ thus obtained is determined by the magnitude of the portion of the signal $\dot{c}_1$ appearing at the collector of transistor $Q_1$ and the magnitude of the portion of the signal $\dot{b}_1$ appearing at the collector of transistor $Q_3$. The rate of the signal distributed is determined by the difference $\Delta$ V between the base voltage of the transistors $Q_1$ and $Q_2$ or $Q_4$ and $Q_3$, and thus the phase of the signal $\dot{d}$ can be varied within the range of from $\theta_1$ to $-\theta_2$ by controlling the difference $\Delta$V.

Figure 4:
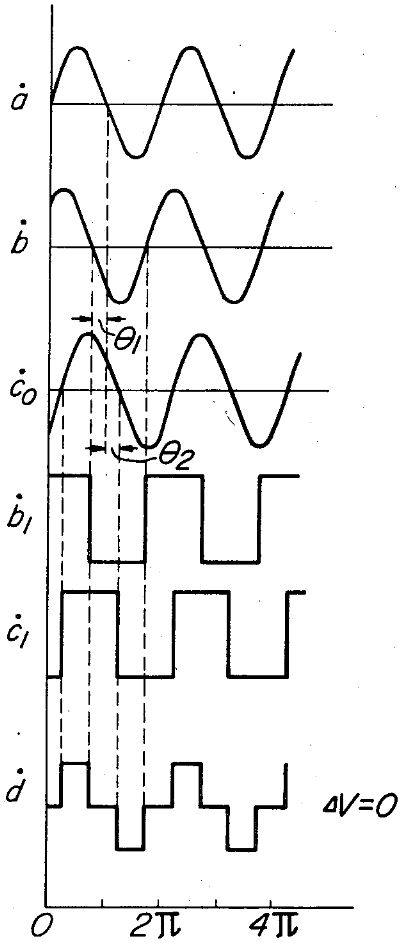
FIG. 4 shows signal waveforms appearing at various parts of the circuit shown in FIG. 3.

FIG. 4 shows the waveforms of the signals $\dot{a}$, $\dot{b}_o$, $\dot{c}_o$, $\dot{b}_1$, $\dot{c}_1$ and $\dot{d}$. In FIG. 3, the differential amplifier pair composed of the transistors $Q_5$ to $Q_8$ is provided for converting the sinusoidal waveform signals $\dot{b}_o$ and $\dot{c}_o$ into the rectangular waveform signals $\dot{b}_1$ and $\dot{c}_1$ for the reasons which will be described below. Even in an integrated circuit, there occurs generally a flustuation in the current amplification factor hfe and base-emitter voltage $V_{BE}$ of transistor forming part of such integrated circuit. In the circuit shown in FIG. 3, a deviation occurs in the ratio of current distribution to the transistors $Q_5$ and $Q_6$ or $Q_7$ and $Q_8$ due to the deviation of about 20 mV between the bias voltage for the transistors $Q_5$ and $Q_6$ or $Q_7$ and $Q_8$ and the deviation of about 10 mV between the base-emitter voltage $V_{BE}$ of these transistors when the level of the signals $\dot{b}_o$ and $\dot{c}_o$ is lower than about 50 mV$p$—$p$. That is, $\dot{b}_1 \neq -\dot{b}_2$ and $\dot{c}_1 \neq -\dot{c}_2$ in this case. Thus $|\dot{b}_1| \neq |\dot{c}_1|$, and the signal $\dot{d}$ is not in phase with the signal $\dot{a}$ and an initial phase deviation occurs even when $p = q = 1/2$ in the equation (1) giving the relation $\dot{d}=p\dot{b}_1+q\dot{c}_1$. Further, a variation in the ambient temperature may result in a corresponding variation in the base-emitter voltage $V_{BE}$ and bias voltage. This causes a variation in the phase deviation resulting in an instable operation. The transistors $Q_5$ to $Q_8$ are preferably arranged for switching operation in order to eliminate the adverse effect due to the fluctuation of these voltages. More precisely, the level of the input signal may be sufficiently increased to such an extent that the transistors are saturated so that a repeated on-off signal appears at the output in response to the sinusoidal waveform input signal. By this arrangement, the adverse effect due to the deviation of hfe, $V_{BE}$ and bias voltage can be obviated. Such an operation is especially effective when the initial phase deviation is severely specified. When, however, the specification is not so severe, the transistors may not be arranged for switching operation and a resistor of a suitably large resistance value may be connected to the emitters of transistors for reducing the fluctuation of the kind above described to some extent. In this case, the sinusoidal waveform input signal may be applied in a non-saturated form. Further, the fluctuation of *hfe*, $V_{BE}$, etc. will be reduced to a negligible extent by future improvements in the manufacturing technique of integrated circuits. In such a case too, it is unnecessary to convert the sinusoidal waveform signal into the rectangular waveform signal. The elimination of the need for converting the sinusoidal waveform into the rectangular waveform is advantageous in that a harmonic stop filter as described below need not be provided in the output circuit.

When the differential amplifier pair composed of the transistors $Q_5$ to $Q_8$ is provided to convert the sinusoidal waveform signals $\dot{b}_o$ and $\dot{c}_o$ into the rectangular waveform signals $\dot{b}_1$ and $\dot{c}_1$ as shown in FIG. 3, the output $\dot{d}$ from the adder composed of the transistors $Q_1$ to $Q_4$ is in the form of a composite signal of rectangular waveform including harmonics as seen in FIG. 4. This signal $\dot{d}$ includes harmonics of odd order such as $3f_o$, $5f_o$, etc. where $f_o$ is the fundamental frequency. On the other hand, the crystal X vibrates also with harmonic vibration modes of odd order such as the third order, fifth order, etc. in addition to the fundamental vibration mode. When, therefore, the crystal X is energized by the signal $\dot{d}$ including many harmonics, these harmonics appear in the output signal $\dot{a}$ of the crystal X and a distortion occurs in the waveform of the output signal $\dot{a}$ resulting frequently in unsatisfactory operation of the circuit. To avoid this, a harmonic stop filter 6 such as a transformer or resonant circuit may be provided as a load of the adder composed of the transistors $Q_1$ to $Q_4$ for the purpose of suppressing the harmonics. The same effect can be obtained by providing a harmonic stop trap at the output side of the crystal X.

In the arrangement shown in FIG. 3, the transistors $Q_9$ and $Q_{10}$ serving as a constant current source may be eliminated and the emitters of transistors $Q_5$, $Q_6$ and $Q_7$, $Q_8$ may be directly grounded through respective common emitter resistors. In this case, however, a deviation occurs in the current switching action of the transistors $Q_5$ and $Q_6$ or $Q_7$ and $Q_8$. This arrangement is therefore only practically usable when the stability of the oscillator in the circuit employing this oscillator is not a matter of primary importance.

Figure 5:
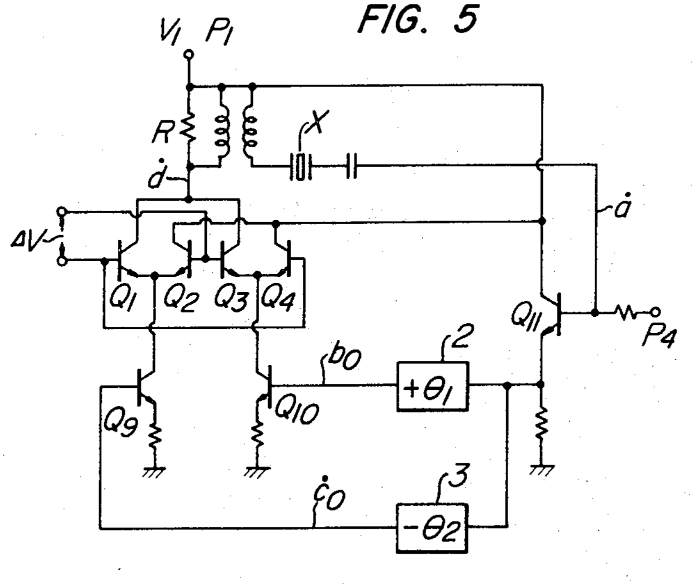
FIG. 5 is a circuit diagram showing the structure of another embodiment of the present invention.

FIG. 5 shows another embodiment of the present invention, and like reference symbols are used in FIG. 5 to denote like parts appearing in FIG. 3. Referring to FIG. 5, phase shifters 2 and 3 apply output signals $\dot{b}_o$ and $\dot{c}_o$ to the bases of transistors $Q_9$ and $Q_{10}$ respectively, and respective outputs appearing at the collectors of these transistors $Q_9$ and $Q_{10}$ are applied directly to an adder composed of transistors $Q_1$, $Q_2$, $Q_3$ and $Q_4$. Such a circuit arrangement is advantageous in that the circuit is simplified in structure and can operate with a low power supply voltage $V_1$.

FIG. 6 is a block diagram of a further embodiment of the present invention in which a voltage controlled oscillator of the above-described kind is applied to a color synchronizing circuit. An oscillation amplifier 1*a* including a tank circuit therein delivers an output signal $\dot{a}$ of 3.58 MHz. This output signal $\dot{a}$ applied to a +45° phase shifter 2 and a −45° phase shifter 3 to obtain respective signals $\dot{b}$ and $\dot{c}$ having a vectorial relationship as shown in FIG. 7*a*. These two signals $\dot{b}$ and $\dot{c}$ are applied to an adder 4 to which a control signal is applied from a phase detector 9 for controlling the relative magnitude of these two signals $\dot{b}$ and $\dot{c}$. The signals $\dot{b}$ and $\dot{c}$ thus controlled in the relative magnitude by the control signal are added to each other to produce a signal $\dot{d}$. This signal $\dot{d}$ is positively fed back to the oscillation amplifier 1*a*. Thus, an oscillator is formed by the above elements. The relation between this signal $\dot{d}$ and the signals $\dot{b}$ and $\dot{c}$ is the same as that give by the equations (1) and (2) described previously. Thus, by controlling the relative magnitude of $p$ and $q$, the phase $\alpha$ of the composite signal $\dot{d}$ can be controlled in a manner as shown in FIG. 7*b* or 7*c*. FIG. 7*b* shows the case in which $p < q$, while FIG. 7*c* shows the case in which $p > q$. When $p = 1$ and $q = 0$, the signal $\dot{d}$ is equal to the signal $\dot{b}$ or $\dot{d} = \dot{b}$ and the signal $\dot{d}$ is delayed by 45° relative to the signal $\dot{a}$. Further, when $p = 0$ and $q = 1$, $\dot{d} = \dot{c}$ and the signal $\dot{d}$ is advanced by 45° relative to the signal $\dot{a}$. Therefore, this oscillation circuit provides a phase shifting oscillator having a variable phase range of ±45°.

The phase detector 9 in FIG. 6 compares the phase of a burst signal $v_b$ with the phase of the output signal $\dot{b}$ of the phase shifter 2 and applies its output voltage to the adder 4 as a phase control voltage. The circuit acts as a voltage controlled oscillator of the automatic phase control system when this phase control voltage is used to control the relative magnitude of $p$ and $q$. The signal whose phase is compared with the phase of the burst signal $v_b$ may be the output signal $\dot{a}$ of the oscillation amplifier *1a*. The output voltage of the phase detector 9 is zero and the oscillator loop is stabilized when the phase difference between the signal $\dot{b}$ and the burst signal $v_b$ is 90° or 270°.

The signals $\dot{b}$ and $\dot{c}$ may be applied to an adder 8 which is similar to the adder 4 in construction thereby to obtain a signal $\dot{e}$ which is the vector sum of these two signals $\dot{b}$ and $\dot{c}$, and a hue control voltage $V_c$ may be applied to the adder 8 from an external source. By this arrangement, a chrominance subcarrier $e$ having a variable phase range of ±45° can be obtained on the same principle as that described above and hue control can be attained.

Further, the burst signal $v_b$ and the signal $\dot{c}$ may be applied to a detector 10 to detect the level of the burst signal $v_b$, and the output from the detector 10 may be applied to an ACC or color killer so that this output may be utilized to control the operation of the ACC or color killer. Furthermore, the signal $\dot{c}$ may be applied to the phase detector 9 in lieu of the signal $\dot{b}$, and the signal $\dot{b}$ may be applied to the detector 10 in lieu of the signal $\dot{c}$.

The input to the detector 10 may be the same as the input to the phase detector 9 which may be the output $\dot{b}$ or $\dot{c}$ from the phase shifter 2 or 3 or the output $\dot{a}$ from the oscillation amplifier 1*a*. In this case, however, the phase of the burst signal applied to the detector 10 must be delayed by 90° or 270° relative to the phase of the burst signal applied to the phase detector 9. It is therefore necessary to interpose a phase delay circuit.

The above description has referred to the arrangement in which the phase shifters 2 and 3 carry out a phase shift of ±45°. According to this arrangement, the phase difference between the outputs from these two phase shifters 2 and 3 is exactly 90° and the input to the detector 10 is delayed by 90° relative to the input to the phase detector 9. This arrangement is advantageous in that the burst signal applied to the detector 10 need not have a phase difference of 90° relative to the burst signal applied to the phase detector 9 thereby eliminating the need for provision of any additional circuits and integration can be conveniently attained. The degree of phase shift by the phase shifters can be freely selected depending on the service so that it may be ±30°, ±60°, etc. Such phase shift may be employed not only when the circuit according to the present invention is used as a voltage controlled oscillator but also when such circuit is applied to a color synchronizing circuit. Further, the degree of plus phase shift by one phase shifter need not necessarily exactly agree with the degree of minus phase shift by the other phase shifter. Any essential obstruction is not encountered in the operation of the circuit according to the present invention when the difference therebetween is acceptably small.

FIG. 8 is a practical circuit diagram of the color synchronizing circuit described with reference to FIG. 6, and FIG. 9 shows operating signal waveforms appearing at various parts of the circuit shown in FIG. 8.

Referring to FIG. 8, a power supply voltage $V_1$ is applied to a terminal $P_1$, and suitable bias voltages $V_2$, $V_3$ and $V_4$ are applied to terminals $P_2$, $P_3$ and $P_4$ respectively. Reference numerals 6 and 7 designate harmonic stop filters.

A crystal X applies its output signal $\dot{a}$ to an emitter follower transistor $Q_{11}$. The output from the emitter follower transistor $Q_{11}$ is applied through the ±45° phase shifter 2 consisting of a resistor $R_1$ and a capacitor $C_1$ and the −45° phase shifter 3 consisting of a resistor $R_2$ and a capacitor $C_2$ to respective emitter follower transistors $Q_{16}$ and $Q_{17}$ to obtain signals $\dot{b}_o$ and $\dot{c}_o$ from the emitters of these transistors $Q_{16}$ and $Q_{17}$. These signals $\dot{a}$, $\dot{b}_o$ and $\dot{c}_o$ have sinusoidal waveforms as seen in FIG. 9. The signal $\dot{b}_o$ is applied to the base of transistor $Q_8$, while the signal $\dot{c}_o$ is applied to the base of transistor $Q_5$. Transistors $Q_5$, $Q_6$, $Q_7$ and $Q_8$ constitute a pair of differential amplifiers which amplify the sinusoidal waveform signals $\dot{b}_o$ and $\dot{c}_o$ up to a saturation level to convert them into rectangular waveform signals $\dot{b}_1$, $\dot{b}_2$ $(=-\dot{b}_1)$ and $\dot{c}_1$, $\dot{c}_2$ $(=-\dot{c}_1)$ as seen in FIG. 9. The signals $\dot{b}_1$ and $\dot{c}_1$ are applied to the adder 4 composed of transistors $Q_1$, $Q_2$, $Q_3$ and $Q_4$ forming a differential amplifier pair so that a signal $\dot{d}$ representing the vector sum of these two signals $\dot{b}_1$ and $\dot{c}_1$ appears across a load connected to the collectors of transistors $Q_1$ and $Q_3$. The relative magnitude of the signals $\dot{b}_1$ and $\dot{c}_1$ is controlled by applying the output voltage of the phase detector 9 to the common-connected bases of transistors $Q_1$ and $Q_4$ and to the common-connected bases of transistors $Q_2$ and $Q_3$ in the manner described with reference to the block diagram shown in FIG. 6. In this case, the base voltage of the transistors $Q_1$ and $Q_4$ or $Q_2$ and $Q_3$ in the adder 4 may be fixed and one of the outputs from the phase detector 9 may be used to control the base voltage of the transistors $Q_2$ and $Q_3$ or $Q_1$ and $Q_4$. The above operation is the same in principle as that of the voltage controlled oscillator described previously. In the case of the color synchronizing circuit, the following operation takes place in addition to this operation.

In a manner similar to the production of the vector sum of the two signals $\dot{b}_1$ and $\dot{c}_1$, the signals $\dot{b}_2$ and $\dot{c}_2$ are applied to the adder 8 composed of transistors $Q_{12}$, $Q_{13}$, $Q_{14}$ and $Q_{15}$ forming a differential amplifier pair so that a signal $\dot{e}$ representing the vector sum of these two signals $\dot{b}_2$ and $\dot{c}_2$ appears across a load connected to the collectors of transistors $Q_{12}$ and $Q_{14}$. A control voltage is similarly applied through a hue control variable resistor VR to the common-connected bases of transistors $Q_{12}$ and $Q_{15}$ and to the common-connected bases of transistors $Q_{13}$ and $Q_{14}$ in a manner as described above so as to control the relative magnitude of the signals $\dot{b}_2$ and $\dot{c}_2$.

The signals $\dot{b}_o$ or $\dot{c}_o$ and $\dot{c}_o$ or $\dot{b}_o$ are applied to the phase detector 9 and detector 10 respectively which compare the phase of these signals with the phase of the burst signal $v_b$ and detect the level of the burst signal $v_b$. According to this circuit arrangement, the burst signal applied to the detector 10 need not be 90° out of phase relative to the burst signal applied to the phase detector 9 and may be in phase with each other. Therefore, the burst signal $v_b$ can be applied to this circuit through a single terminal $P_7$ as shown.

In the circuit shown in FIG. 8, the sinusoidal waveform signals are converted into the rectangular waveform signals by the differential amplifier pair composed of the transistors $Q_5$ to $Q_8$ for the reasons described previously. Further, the harmonic stop fillers 6 and 7 are also provided in the circuit for the reasons described previously. That is, these filters are provided to eliminate odd order harmonics whose frequencies are 3 times, 5 times, etc. of the fundamental frequency of 3.58 MHz.

We claim:

1. An oscillator comprising an amplifier, a first phase shifter for advancing the phase of an input signal and a second phase shifter for delaying the phase of an input signal, an adder including means for controlling the relative magnitude of two signals to be added to each other in response to an externally applied control voltage, a tank circuit, means for applying the output signal of said amplifier to said first and second phase shifters, means for applying the two output signals of said first and second phase shifters to said adder, and feedback means for the positive feedback of the output signal of said adder to said amplifier through said tank circuit.

2. An oscillator as claimed in claim 1, in which said means for applying the two output signals of said first and second phase shifters to said adder comprises a pair of wave shaping amplifiers for amplifying the output signals of said first and second phase shifters up to a saturation level, means for applying the two output signals of said first and second phase shifters to said wave shaping amplifiers respectively, and means for applying the two output signals of said wave shaping amplifiers to said adder, and said feedback means for the positive feedback of the output signal of said adder to said amplifier through said tank circuit comprises a harmonic stop filter for eliminating harmonics of the fundamental resonance frequency of said tank circuit, means for applying the output signal of said adder to said harmonic stop filter, and means for applying in positive feedback fashion the output signal of said harmonic stop filter to said amplifier through said tank circuit.

3. An oscillator for generating an output which is in synchronism with a burst signal comprising an amplifier, a first phase shifter for advancing the phase of an input signal and a second phase shifter for delaying the phase of an input signal, a first adder including means for controlling the relative magnitude of two signals to be added to each other in response to an externally applied control voltage, a tank circuit means including substantially an inductance element and a capacitance element, a phase detector for comparing the phase of one signal with the phase of another signal thereby producing an output signal representative of the phase difference therebetween, a second adder, means for applying the output signal of said amplifier to said first and second phase shifters, means for applying the output signals of said first and second phase shifters to said first adder, feedback means for the positive feedback of the output signal of said first adder to the input side of said amplifier through said tank circuit means, means for applying as one of inputs to said phase detector a signal which has a fixed phase relationship with the output signal of said amplifier, means for applying the burst signal to said phase detector as another input thereto, means for applying the output signal of said phase detector to said first adder as the external control signal, and means for applying the output signals of said first and second phase shifters to said second adder thereby deriving a chrominance subcarrier from said second adder.

4. An oscillator as claimed in claim 3, in which said signal having a fixed phase relationship with the output signal of said amplifier is a signal obtained by passing the output signal of said amplifier through said first phase shifter.

5. An oscillator as claimed in claim 3, in which said first phase shifter shifts the phase by +45° and said second phase shifter shifts the phase by −45°.

6. An oscillator as claimed in claim 3, which comprises further a detector which compares the burst signal with a signal having a fixed phase relationship with the output signal of said amplifier for obtaining a signal whose level is determined dependent upon the presence or absence of the burst signal so as to utilize this signal for controlling an ACC or color killer.

7. An oscillator as claimed in claim 6, in which said signal having a fixed phase relationship with the output signal of said amplifier is a signal obtained by passing the output signal of said amplifier through said second phase shifter.

8. An oscillator as claimed in claim 6, in which said signal having a fixed phase relationship with the output signal of said amplifier is a signal obtained by passing the output signal of said amplifier through said first phase shifter.

9. An oscillator as claimed in claim 6, in which said signal having a fixed phase relationship with the output signal of said amplifier is the output signal itself of said amplifier.

* * * * *